Oct. 3, 1933.   M. T. LOTHROP   1,928,627
BEARING MEMBER
Filed Jan. 2, 1931
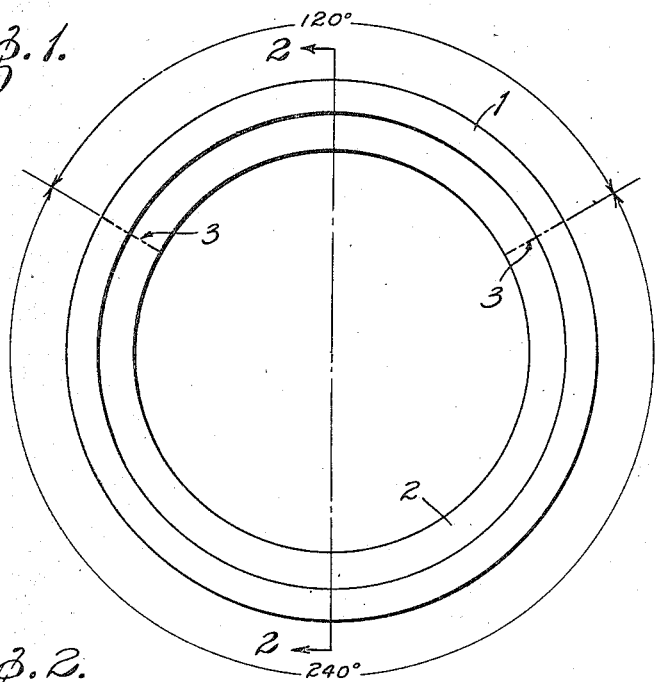
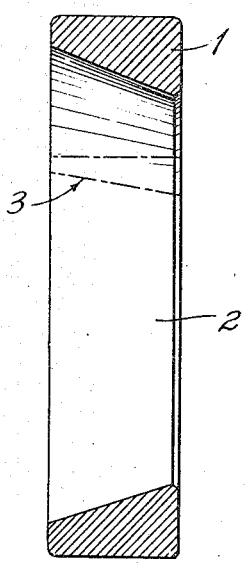
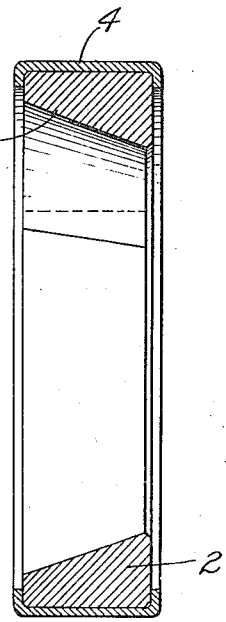
INVENTOR.
Marcus T. Lothrop,
by Can Han & Gravely,
HIS ATTORNEYS Patented Oct. 3, 1933

1,928,627

UNITED STATES PATENT OFFICE 1,928,627

BEARING MEMBER

Marcus T. Lothrop, Canton, Ohio, assignor to The Timken Roller Bearing Company, Canton, Ohio, a corporation of Ohio Application January 2, 1931. Serial No. 506,018

3 Claims. (Cl. 308—216)

My invention relates to the bearing members of antifriction bearings; and it has for its principal object to decrease the cost of making such members without diminishing the effectiveness of the member for its work. The invention is particularly applicable to the bearing members of very large bearings.

The invention consists principally in making the stationary bearing member of two arcuate portions welded together, the larger portion being of carbon steel or other suitable comparatively inexpensive steel, and the portion of the bearing member that is subjected to the heavy load being made of high grade alloy steel or other comparatively expensive high grade material.

In the accompanying drawing,

Fig. 1 is an end view of a bearing member embodying my invention,

Fig. 2 is a sectional view thereof on the line 2—2 of Fig. 1, and

Fig. 3 is a similar sectional view of a modification.

In many uses of antifriction bearings, one of the bearing members does not rotate. For example, in large rolling mills and in numerous railway car constructions, the cup or outer bearing member does not rotate. The radial load in such constructions is concentrated on an arc of about 120° or less at the upper part of the bearing and the wear on the bearing cup is largely confined to this portion thereof. This radial load is quite heavy and requires the use of some such material as high grade alloy steel in the bearing member. I have found that ordinary carbon steel or other comparatively inexpensive steel is satisfactory for use throughout that portion of the stationary bearing member that does not carry any considerable portion of the radial load and that is subject to comparatively little wear. The cost of the high grade alloy steel is comparatively high; and considerable waste and additional expense is involved in making the bearing cup of a very large bearing entirely of such high grade alloy steel.

In order to retain the advantage of having high grade alloy steel to carry the radial load, and, at the same time, to reduce the cost of the bearing member, I have made a bearing member of two different materials, and the drawing illustrates a cup or outer bearing member so made. The portion 1 of the bearing member that is subject to the radial load, extending through an arc of about 120° at the top of the bearing in ordinary installations, is made of suitable high grade alloy steel or the like; and the remainder 2 of the bearing member is made of other steel, as ordinary carbon steel, that is well adapted for the purpose of a bearing member that does not carry any considerable radial load and that is subject to slight wear. The two parts of the bearing member may be welded together as indicated at 3.

As shown in Fig. 2 the two parts are not welded, but are held together by means of a band 4 extending around the periphery of the assembled parts.

One combination of steels that is satisfactory for the purpose is molybdenum steel such as that known as S. A. E. No. 4615 for the wearing portion of the cup and carbon steel such as that known as S. A. E. No. 1020 for the remainder of the cup. The composition of S. A. E. steel No. 4615 is:

Carbon _____ 0.10 per cent–0.20 per cent
Manganese _____ 0.30 per cent–0.60 per cent
Phosphorus _____ 0.04 per cent maximum
Sulphur _____ 0.05 per cent maximum
Nickel _____ 1.50 per cent–2.00 per cent
Molybdenum _____ 0.20 per cent–0.30 per cent
Silicon _____ 0.15 per cent minimum The composition of the carbon steel known as S. A. E. No. 1020 is:

Carbon _____ 0.15 per cent–0.25 per cent
Manganese _____ 0.30 per cent–0.60 per cent
Phosphorus _____ 0.045 per cent maximum
Sulphur _____ 0.055 per cent maximum Both of these steels require carburization before being satisfactory for use is bearing members and they could be combined in the bearing member and given the same carburization treatment with the result of bringing both steels to the condition required for the use to which the bearing cup is subjected.

Another combination of steels suitable for the purpose is chromium steel of the kind known as S. A. E. No. 52100 for the wearing portion of the cup and carbon steel of the kind known as S. A. E. No. 1095 for the remainder of the cup. S. A. E. steel No. 52100 is a chromium steel having the following composition:

Carbon _____ 0.95 per cent–1.10 per cent
Manganese _____ 0.20 per cent–0.50 per cent
Phosphorus _____ 0.30 per cent maximum
Sulphur _____ 0.035 per cent maximum
Chromium _____ 1.20 per cent–1.50 per cent
Silicon _____ 0.15 per cent minimum S. A. E. steel No. 1095 is a carbon steel having the following composition:

Carbon_____ 0.90 per cent–1.05 per cent
Manganese_____ 0.25 per cent–0.50 per cent
Phosphorus_____ 0.04 per cent maximum
Sulphur_____ 0.055 per cent maximum Other combinations of steels may be found that will be satisfactory for the purpose.

In practice, suitable sections of the two materials are rolled; cut off to the proper length to make a bearing member; rolled, bent or die-shaped into proper arcuate form; welded together and then subjected to the usual finishing operations of bearing manufacture.

In the case of bearings where the cone or inner bearing member is stationary, the cone might be made of two sections of different materials welded together as above described.

The above described construction has the important advantage of providing a special material at the point where it is needed, but not using said material throughout the whole bearing member where it is not needed and where other materials may be more satisfactory for the purpose. Bearings embodying my invention have been thoroughly tested out and have proved to be highly satisfactory.

What I claim is:

1. A stationary bearing member for taper roller bearings composed of two arcuate sections having their meeting edges welded together, one of said sections being short and being composed of high grade steel capable of carrying heavy load and the other section constituting the greater portion of said member and being composed of ordinary steel.

2. A stationary bearing member for taper roller bearings composed of two arcuate sections having their meeting edges welded together, one of said sections being short and being composed of high grade steel capable of carrying heavy load and the other section constituting the greater portion of said member and being composed of ordinary steel, both of said sections being carburized.

3. A stationary bearing member for taper roller bearings composed of two arcuate sections having their meeting edges welded together, one of said sections being short and being composed of alloy steel capable of carrying heavy load and the other section constituting the greater portion of said member and being composed of ordinary steel.

MARCUS T. LOTHROP.